(12) United States Patent
Marcu et al.

(10) Patent No.: US 9,057,894 B2
(45) Date of Patent: Jun. 16, 2015

(54) METHOD AND APPARATUS FOR ADAPTIVE DISPLAY CALIBRATION

(75) Inventors: Gabriel Marcu, San Jose, CA (US); Jun Qi, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 567 days.

(21) Appl. No.: 13/407,552

(22) Filed: Feb. 28, 2012

(65) Prior Publication Data

US 2013/0226495 A1    Aug. 29, 2013

(51) Int. Cl.
*G06F 19/00* (2011.01)
*G02F 1/13* (2006.01)
*G02F 1/1335* (2006.01)

(52) U.S. Cl.
CPC .. *G02F 1/1309* (2013.01); *G02F 2001/133624* (2013.01); *G02F 2203/69* (2013.01)

(58) Field of Classification Search
USPC .......................... 702/107; 345/589, 207, 690
See application file for complete search history.

(56) References Cited

U.S. PATENT DOCUMENTS

| | | | |
|---|---|---|---|
| 7,884,832 B2 | 2/2011 | Alessi et al. | |
| 2009/0116091 A1 | 5/2009 | Overmann et al. | |
| 2010/0066837 A1 | 3/2010 | Kwong | |
| 2010/0141624 A1* | 6/2010 | Marcu | 345/207 |
| 2010/0315429 A1* | 12/2010 | Rykowski | 345/589 |
| 2012/0056910 A1 | 3/2012 | Safaee-Rad et al. | |
| 2012/0075435 A1 | 3/2012 | Hovanky et al. | |

FOREIGN PATENT DOCUMENTS

| | | |
|---|---|---|
| JP | 2006-113151 | 4/2006 |
| JP | 2006349835 | 12/2006 |
| JP | 2009225440 | 10/2009 |
| JP | 2009294296 | 12/2009 |
| JP | 201195386 | 5/2011 |
| TW | 200614019 | 5/2006 |

OTHER PUBLICATIONS

Wu et al., U.S. Appl. No. 13/477,680, filed May 22, 2012.
Albrecht et al., U.S. Appl. No. 13/569,940, filed Aug. 8, 2012.

\* cited by examiner

*Primary Examiner* — John Breene
*Assistant Examiner* — Hien Vo
(74) *Attorney, Agent, or Firm* — Treyz Law Group; Kendall P. Woodruff

(57) ABSTRACT

A calibration system may be provided for calibrating displays in electronic devices during manufacturing. The calibration system may include calibration computing equipment and a test chamber having a light sensor. The calibration computing equipment may be configured to operate the light sensor and the display to gather display performance data. The calibration computing equipment may extract display performance statistics from the display performance data and adaptively select and perform display calibration sequences using the display performance statistics. The calibration computing equipment may be configured to determine whether or not to perform display calibration and whether or not to gather additional display performance data based on display performance statistics extracted during a preceding display calibration sequence. The calibration computing equipment may be configured to iteratively and adaptively perform display calibration sequences until a display is successfully calibrated.

21 Claims, 10 Drawing Sheets ic # METHOD AND APPARATUS FOR ADAPTIVE DISPLAY CALIBRATION

BACKGROUND

This relates to calibration, and, more particularly, to calibration of displays in electronic devices during manufacturing.

Electronic devices such as portable computers, media players, cellular telephones, set-top boxes, and other electronic equipment are often provided with displays for displaying visual information.

Display color performance for a given display can be characterized by a native white point. The native white point of a display is commonly defined by a set of chromaticity values. The chromaticity values associated with the native white point are used to represent the color produced by the display when all colors of display pixels in the display are operating at full power.

Due to manufacturing variations, the native white point of one display may be different from the native white point of another display. Display color performance variations of this type can pose challenges when attempting to manufacture electronic devices having consistent display color performance.

It would therefore be desirable to be able to provide calibration systems for calibrating electronic devices with color displays.

SUMMARY

A calibration system may be provided for calibrating a display in an electronic device during manufacturing.

A display may include liquid crystal display technology, organic light-emitting diode technology or other suitable display technology for generating light for the display. The display may include display pixels for generating light of various colors. The display may be provided with display driver circuitry for operating the display pixels. The display driver circuitry may drive selected combinations of colored display pixels at respective selected power levels to generate light having a color that is a mixture of the individual colors generated by the display pixels.

A calibration system may be provided with calibration computing equipment and a test chamber. The test chamber may be provided with a light sensor mounted in the test chamber for converting display light into display performance data. During calibration operations, an electronic device having a display may be placed in the test chamber. The calibration computing equipment may operate the electronic device and the light sensor.

During calibration operations, the calibration computing equipment may provide signals to the electronic device instructing the device to operate the display. The display may be operated by powering all display pixels of all colors at full power, by operating some display pixels while inactivating other display pixels, by operating display pixels of first and second colors at respective first and second power levels, or by operating display pixels under other conditions.

While operating the display, the light sensor may be used in gathering display performance data such as display light output data. The calibration computing equipment may process the gathered performance data and compare the gathered performance data to target performance data such as a range of acceptable values. Processing the gathered performance data may include computing a white point such as a native white point for the display from the gathered performance data.

The calibration computing equipment may generate display calibration data such as one or more display calibration parameters based on the comparison of the display performance data with target performance data. The calibration computing equipment may transmit the generated display calibration data to the electronic device over a wired or wireless path. The display calibration data may be used by the electronic device to calibrate (e.g., correct) the native white point of the display to a corrected white point.

Comparing the gathered performance data to the range of acceptable values may include determining whether or not a native display white point or a previously corrected display white point is within an acceptable range of a target white point. The target white point may be predetermined or may be determined during calibration operations.

In response to determining that the display performance data is within an acceptable range, calibration operations may be terminated and appropriate action may be taken for a passing display. Appropriate action for a passing display may include shipping the electronic device having the display to a customer, passing the electronic device having the display on to a subsequent calibration station or testing station, or passing the display on to a subsequent manufacturing station.

In response to determining that the display performance data is outside the acceptable range, the calibration computing equipment may perform additional calibration operations for the display. Performing additional calibration operations may include adaptively selecting and executing additional calibration sequences (also sometimes referred to herein as calibration measurements) for the display.

Performing additional calibration sequences (measurements) may include operating the display using previously uploaded display calibration data, operating all display pixels at a common reduced power, operating different portions of the display pixels at different power levels, or any combination of these steps. If desired, during an additional calibration sequence, the display may be operated in multiple operational modes.

Performing additional calibration sequences (measurements) for the display may include gathering additional performance data while operating the display, processing the additional performance data, measuring a corrected white point for the display, computing relative color intensities from the gathered additional performance data, computing color cross-talk values from the gathered additional performance data, or computing other statistical measures of display performance. During each additional calibration sequence, the processed additional performance data may be compared with a predetermined standard.

If desired, each additional calibration sequence may be selected (configured) by the calibration computing equipment based on previously gathered display performance data (e.g., based on the result of one or more preceding calibration sequences). As an example, if a native display white point is determined to be skewed toward a particular color, a subsequent calibration sequence may include gathering additional performance data while powering the display pixels of that color at several distinct power levels or otherwise gathering additional performance data specific to the display pixels of that color.

The calibration computing equipment may be configured to continue performing additional calibration sequences for the display until the gathered performance data of that calibration sequence is within the acceptable range or until a predetermined maximum number of calibration sequences has been performed.

Further features of the invention, its nature and various advantages will be more apparent from the accompanying drawings and the following detailed description of the preferred embodiments.

DETAILED DESCRIPTION

Electronic devices such as cellular telephones, media players, computers, set-top boxes, wireless access points, and other electronic equipment having displays may be calibrated during manufacturing. Displays may include liquid-crystal display (LCD) screens, light-emitting diodes (LEDs), organic light-emitting diodes (OLEDs), and other components such as touch-sensitive components that present visual information and status data and/or gather user input data. Display color performance may be characterized, in part, by color performance statistics such as a display white point. The display white point of a given display may be measured and modified to match a target white point during calibration operations.

Figure 1:
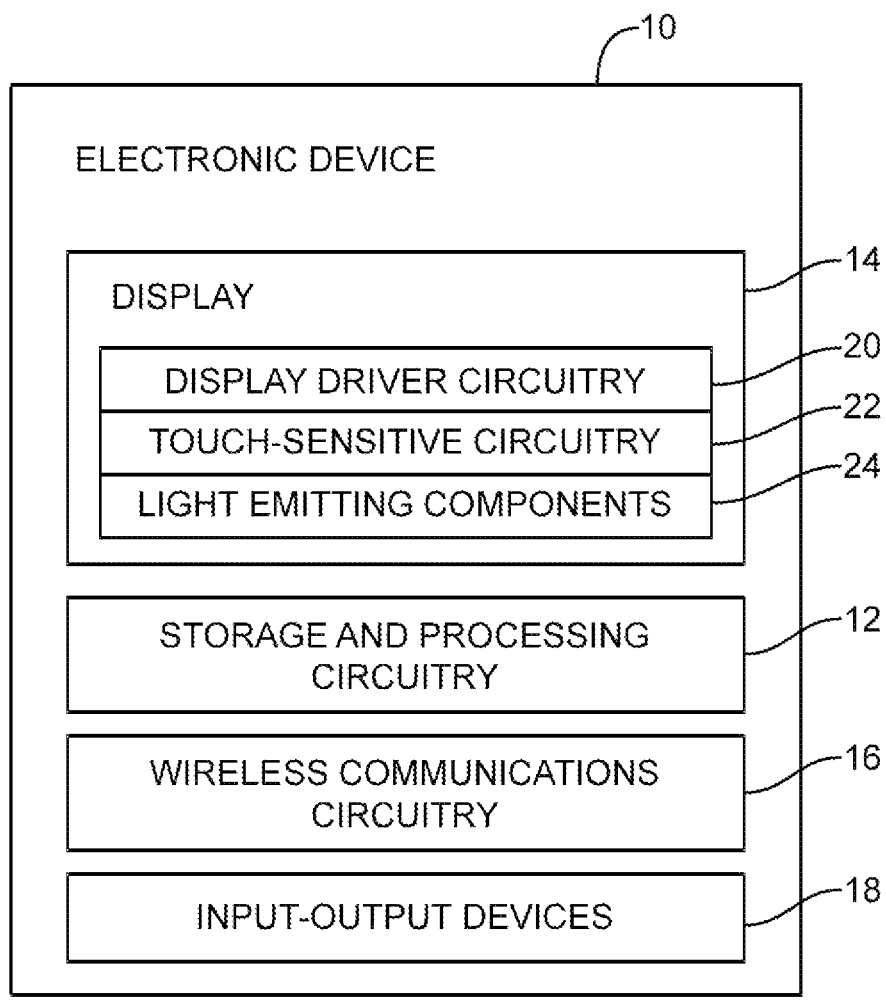
FIG. 1 is a diagram of an illustrative electronic device having a display in accordance with an embodiment of the present invention.

An illustrative electronic device of the type that may be provided with a display is shown in FIG. 1. Electronic device 10 may be a computer such as a computer that is integrated into a display such as a computer monitor, a laptop computer, a tablet computer, a somewhat smaller portable device such as a wrist-watch device, pendant device, or other wearable or miniature device, a cellular telephone, a media player, a tablet computer, a gaming device, a navigation device, a computer monitor, a television, or other electronic equipment.

As shown in FIG. 1, device 10 may include a display such as display 14. Display 14 may include light-emitting components 24, touch-sensitive circuitry 22, display driver circuitry 20 for operating light-emitting components 24, and other display components.

Light-emitting components 24 may include display pixels formed from reflective components, liquid crystal display (LCD) components, organic light-emitting diode (OLED) components, or other suitable display pixel structures. To provide display 14 with the ability to display color images, light-emitting components 24 may include display pixels having color filter elements. Each color filter element may be used to impart color to the light associated with a respective display pixel in the pixel array of display 14.

Display touch-circuitry 22 may include capacitive touch electrodes (e.g., indium tin oxide electrodes or other suitable transparent electrodes) or other touch sensor components (e.g., resistive touch technologies, acoustic touch technologies, touch sensor arrangements using light sensors, force sensors, etc.). Display 14 may be a touch screen that incorporates display touch circuitry 22 or may be a display that is not touch sensitive.

Display driver circuitry 20 may, as an example, include a driver integrated circuit that is mounted to a display layer such as a thin-film-transistor layer of a liquid crystal display. Display driver circuitry 20 may be coupled to additional circuitry in device 10 such as storage and processing circuitry 12.

Processing circuitry 12 may include microprocessors, microcontrollers, digital signal processor integrated circuits, application-specific integrated circuits, and other processing circuitry. Volatile and non-volatile memory circuits such as random-access memory, read-only memory, hard disk drive storage, solid state drives, and other storage circuitry may also be included in processing circuitry 12.

Processing circuitry 12 may use wireless communications circuitry 16 and/or input-output devices 18 to obtain user input and to provide output to a user. Input-output devices 18 may include speakers, microphones, sensors, buttons, keyboards, displays, touch sensors, and other components for receiving input and supplying output. Wireless communications circuitry may include wireless local area network transceiver circuitry, cellular telephone network transceiver circuitry, and other components for wireless communication.

Figure 2:
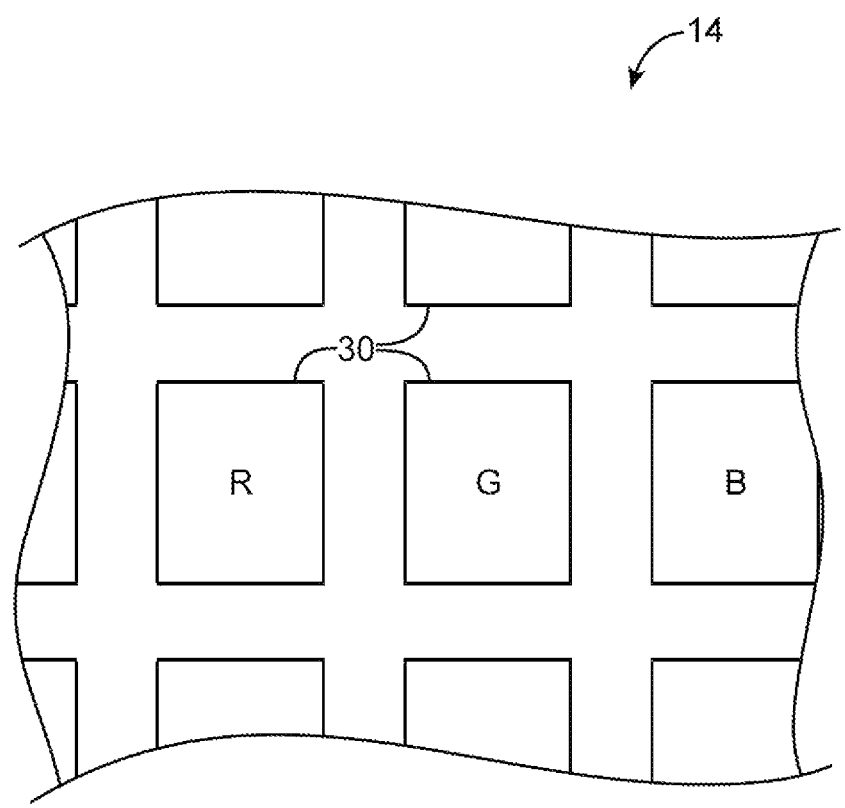
FIG. 2 is a diagram of an illustrative portion of a display showing how colored display pixels may be arranged in rows and columns in accordance with an embodiment of the present invention.

Display 14 may include an array of display pixels. Each display pixel may be used to generate display light associated with a portion of the display. A portion of an illustrative array of display pixels is shown in FIG. 2. As shown in FIG. 2, display 14 may have a pixel array with rows and columns of pixels 30. There may be tens, hundreds, or thousands of rows and columns of display pixels 30. Each pixel 30 may, if desired, be a color pixel such as a red (R) pixel, a green (G) pixel, a blue (B) pixel or a pixel of another color. Red pixels R, for example, may include a red color filter element over a light generating element (e.g., an LED or a liquid crystal element) that absorbs and/or reflects non-red light while passing red light. However, this is merely illustrative. Pixels 30 may include any suitable structures for generating light of a given color.

Display driver circuitry 20 (FIG. 1) such as a display driver integrated circuit and, if desired, associated thin-film transistor circuitry formed on a display substrate layer may be used to produce signals such as data signals and gate line signals (e.g., on data lines and gate lines respectively in display 14) for operating pixels 30 (e.g., turning pixels 30 on and/or off and/or adjusting the intensity or pixels 30). During operation, display driver circuitry 20 may control the values of the data signals and the gate signals to control the light intensity associated with each of the display pixels and thereby display images on display 14.

Display driver circuitry 20 may be used to concurrently operate pixels 30 of different colors in order to generate light having a color that is a mixture of, for example, primary colors R, G, and B. As examples, operating red pixels R and blue pixels B may produce light that appears violet, operating red pixels R and green pixels G may generate light that appears yellow, and operating red pixels R, green pixels G and blue pixels B may generate light that appears white.

However, light that appears white to a human eye may include various different underlying spectral power distributions (e.g., may be generated from various combinations of light of individual colors such as red, green, and blue). As examples, sunlight appears white to the human eye, but includes a relatively large amount of blue light, whereas light from an incandescent light bulb appears white to the human eye but includes a relatively large amount of red light.

Due to manufacturing variances, at full power, some displays may generate relatively larger or smaller amounts of light of each color in comparison with other displays. Due to these manufacturing differences, the white light produced by a display in one device may differ from the white light produced by a display in another device.

These differences may be corrected by adjusting the display control settings of the display in one device so that the display color performance of that display matches the display color performance of a display in another device. Adjusting the display control settings of a display may include adjusting the relative maximum power levels that display control circuitry such as circuitry 20 (FIG. 1) delivers to pixels 30 of each color.

Moreover, in order to produce electronic devices with displays that exhibit uniform display performance across all devices, the display in each device may be calibrated during manufacturing so that the display color performance (e.g., the spectral content of white light) of the display in each device matches a standard (sometimes called a target) display color performance.

Figure 3:
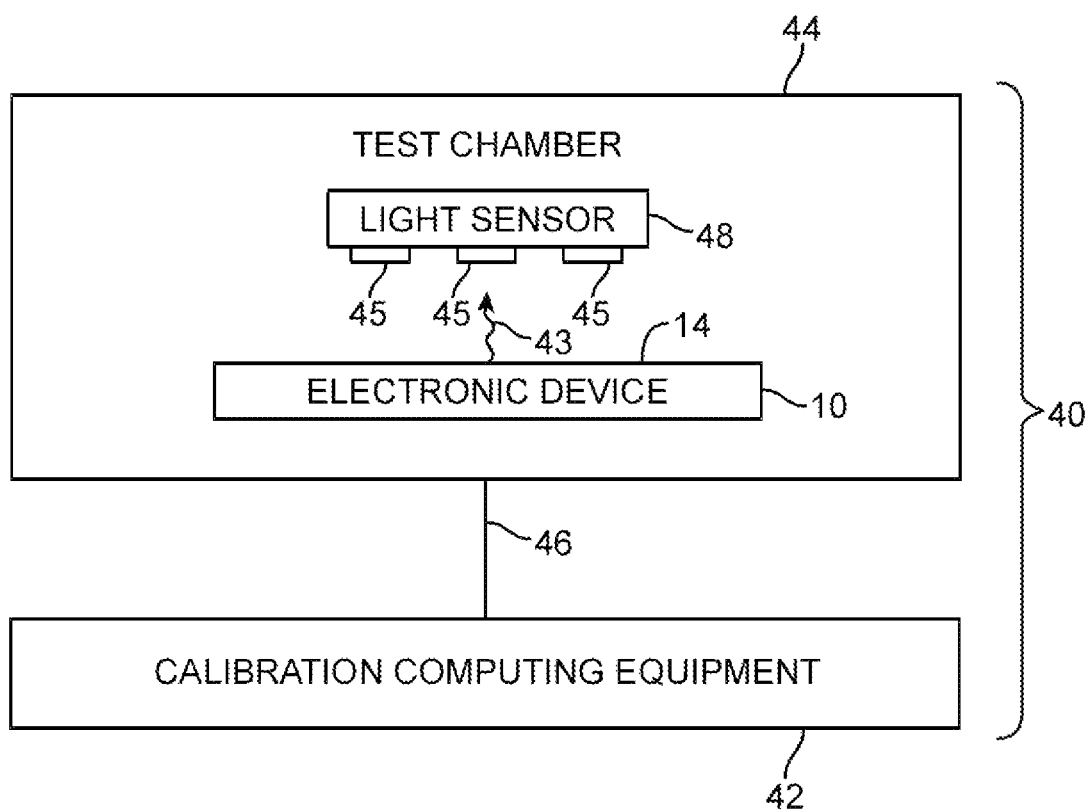
FIG. 3 is a diagram of an illustrative calibration system for performing display calibration including calibration computing equipment and a test chamber having a light sensor in accordance with an embodiment of the present invention.

FIG. 3 is a diagram of an illustrative calibration system that may be used in calibrating displays for devices such as device 10. As shown in FIG. 3, calibration system 40 may include calibration computing equipment 42 that is coupled to a test apparatus such as test chamber 44. Calibration computing equipment 42 may include one or more computers, one or more databases, one or more displays, one or more technician interface devices (e.g., keyboards, touch-screens, joysticks, buttons, switches, etc. for technician control of calibration computing equipment 42), communications components or other suitable calibration computing equipment.

Calibration computing equipment may be coupled to test chamber 44 over a wired or wireless communications path such as path 46.

Test chamber 44 may include a light sensor such as light sensor 48. Light sensor 48 may include one or more light-sensitive components 45 for gathering display light 43 emitted by display 14 of device 10 during calibration operations. Light sensor 48 may include light-sensitive components 45 configured to gather colored light such as colorimetric light-sensitive components and spectrophotometric light-sensitive components.

Light sensor 48 may, for example, be a colorimeter having one or more light-sensitive components 45 corresponding to each set of colored pixels in display 14. For example, a display having red, green and blue display pixels may be calibrated using a light sensor having corresponding red, green, and blue light-sensitive components 45. However, this is merely illustrative. A display may include display pixels for emitting colors other than red, green, and blue, may include pixels of more than three colors, or may include pixels of less than three colors. A light sensor may include one light-sensitive component 45 corresponding to display pixels of each color in display 14, may include more than one light-sensitive component 45 corresponding to the display pixels of each color, may include light-sensitive components 45 corresponding to colors other than the colors of the display pixels, or may include one or more light-sensitive components 45 having spectroscopic structures for detecting relative intensities of a continuous spectrum of colors of light.

Each light-sensitive component 45 may be configured to receive light of a given color by providing light-sensitive component 45 with a color filter over light sensor elements. Each light-sensitive component 45 of light sensor 48 may, for example, include an array of light sensor pixels having a common color filter over all of the light sensor pixels or light sensor 48 may be implemented using an array of light sensor pixels provided with a patterned array of color filters. In configurations in which light sensor 48 includes a spectroscopic light-sensitive component 45, light sensor 48 may include one or more prisms, grisms, gratings or other suitable components for redirecting different colors of light onto different regions of an array of light sensor pixels.

Light sensor 48 may be used by system 40 to convert display light into display performance data for calibrating the color performance of displays such as display 14 in device 10. Calibration computing equipment 42 may use light sensor 48 for gathering performance data for calibrating displays such as display 14.

Test chamber 44 may, if desired, be a light-tight chamber that prevents outside light (e.g., ambient light in a testing facility) from reaching light sensor 48 during calibration operations. Test chamber 44 may, if desired, include light absorbing structures such as light absorbing material that covers one or more interior surfaces of test chamber 44.

During calibration operations, device 10 may be placed into test chamber 44 (e.g., by a technician or by a robotic member). Calibration computing equipment 42 may operate device 10 and light sensor 48 during calibration operations. For example, calibration computing equipment 42 may issue a command (e.g., by transmitting a signal over path 46) to device 10 to operate some or all pixels of display 14. While device 10 is operating the pixels of display 14, calibration computing equipment 42 may operate light sensor 48 to gather display performance data corresponding to the light 43 emitted by display 14.

Calibration computing equipment 42 may receive display performance data from light sensor 48 over path 46. Calibration computing equipment 42 may process the gathered performance data to extract display performance statistics (also sometimes referred to as color performance statistics) from the gathered performance data. Calibration computing equipment 42 may perform calibration operations that include performing one or more adaptively configured calibration sequences. Performing each calibration sequence may include gathering and processing performance data and optionally performing corrective action for the display.

Calibration computing equipment 42 may iteratively perform calibration sequences until a display is satisfactorily calibrated or until a maximum number of iterations has been completed. In some scenarios, calibration operations may be completed in a single calibration sequence with no corrective action for display 14. In some scenarios, calibration operations may require two or more calibration sequences with corrective action performed for display 14 during or between each calibration sequence. If desired, calibration computing equipment 42 may actively configure each calibration sequence based on the results of one or more preceding calibration sequences.

For example, following a first calibration sequence in which performance data is gathered and processed and corrective action for display 14 is taken, calibration computing equipment may determine that a second calibration sequence should be performed and may select that second calibration sequence (e.g., select the type of performance data to be gathered and the type of processing to be performed on the performance data) based on the performance data gathered during the first calibration sequence.

Performing corrective action for display 14 may include generating calibration data such as calibration data for display 14 and uploading the generated calibration data to device 10 over path 46. Uploaded calibration data may be stored on device 10 and used to alter the display color performance of display 14. During normal operations, device 10 may operate a calibrated display 14 using the final uploaded calibration data. Calibration data may include multiplicative factors for scaling the relative power level provided to the display pixels of each color in display 14 or may include other calibration parameters such as constant multiplicative values, time-dependent values, power-level-dependent values or other adaptive parameters for adjusting the color performance of display 14.

Calibration data uploaded from calibration computing equipment 42 to device 10 during calibration operations may be stored on device 10 using storage and processing circuitry 12 (FIG. 1). Uploading calibration data from calibration computing equipment 42 to device 10 may include storing the calibration data in volatile or non-volatile memory for access by software running on circuitry 12 and/or hard coding calibration data into firmware associated with display 14 (e.g., display driver circuitry 20).

Calibration system 40 may be configured to calibrate display color performance for tens, hundreds, thousands, tens of thousands, hundreds of thousands, millions, tens of millions, or more than tens of millions of devices such as device 10. Providing calibration systems 40 that are capable of adaptive display calibration (e.g., display calibration operations in which calibration sequences are adaptively selected and performed based on previously obtained display performance data) may therefore significantly reduce the time required to move devices such as device 10 from manufacturing to delivery to end users and may result in a relatively more robust calibration of displays requiring large calibration corrections than a calibration system having a single preconfigured calibration sequence.

Figure 4:
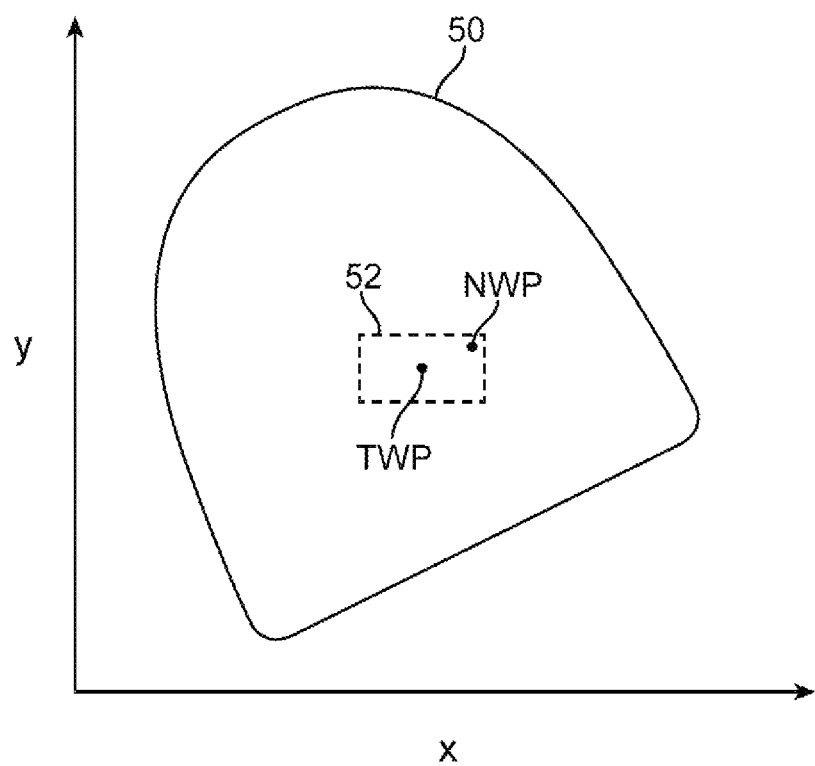
FIG. 4 is an illustrative chromaticity diagram showing how a native display white point that is within a predetermined range of a target white point may remain uncorrected in accordance with an embodiment of the present invention.

FIG. 4 is a chromaticity diagram showing a two-dimensional projection of a color space. The color generated by a display such as display 14 may be represented by the chromaticity values x and y. The chromaticity values may be computed by transforming, for example, three color intensities (e.g., intensities of colored light emitted by a display) such as red intensity, blue intensity, and green intensity into three tristimulus values X, Y, and Z and normalizing the first two tristimulus values X and Y (e.g., by computing $x=X/(X+Y+Z)$ and $y=Y/(X+Y+Z)$. Transforming the color intensities into tristimulus values may be performed using transformations defined by the International Commission on Illumination (CIE) or any other suitable color transformation for computing tristimulus values.

Any color generated by a display such as display 14 may therefore be represented by a point (e.g., a pair of chromaticity values x and y) on a chromaticity diagram such as the diagram shown in FIG. 4. Bounded region 50 of FIG. 4, represents the chromaticity values of all combinations of colors (i.e., the total available color space). The colors that may be generated by a given display are contained within a sub-region of bounded region 50.

During calibration operations, while display 14 is in operation, calibration computing equipment 42 may, as an example, gather performance data (e.g., performance data that includes an emitted-light intensity at each of three colors), transform the three emitted-light intensities into three corresponding tristimulus values, and map those three tristimulus values into a pair of chromaticity values x and y corresponding to an operational mode of display 14. Calibration computing equipment 42 may then compare the mapped pair of chromaticity values to a target set of chromaticity values.

Display color performance of a display such as display 14 may be characterized by color performance statistics such as the "white point" of the display. The white point of a given display is commonly defined by a set of chromaticity values that encode the color produced by the given display when the display is generating all available display colors at full power. Prior to any corrections during calibration, the white point of the display may be referred to as the "native white point" (NWP) of that display.

Due to manufacturing differences between displays, the color performance of a display may differ, prior to calibration of the display, from the desired (target) color performance of the display. The desired display color performance may be characterized by a "target white point" TWP (e.g., a set of chromaticity values that encode the color produced by a standard display or illuminant). For example, a target white point TWP may be the white point corresponding to the D65 illuminant of the International Commission on Illumination (CIE). However, this is merely illustrative. Any suitable target white point TWP may be used for calibration of displays such as display 14.

The difference between the native (i.e., uncalibrated) color performance of a display and the target color performance of the display may be characterized by a difference between the native white point NWP and the target white point TWP of the display as shown in FIG. 4.

During calibration operations, by adjusting the relative output of one or more colors of pixels 30 of display 14, the white point of a display may be adjusted (corrected) to within a predetermined range such as range 52 of a target display color performance such as a target white point (TWP). However, this is merely illustrative. In some scenarios, the measured native white point NWP of the display may be within specified range 52 of target white point TWP as shown in the example of FIG. 4 and calibration operations may be terminated without making any color performance corrections to the display.

Figure 5:
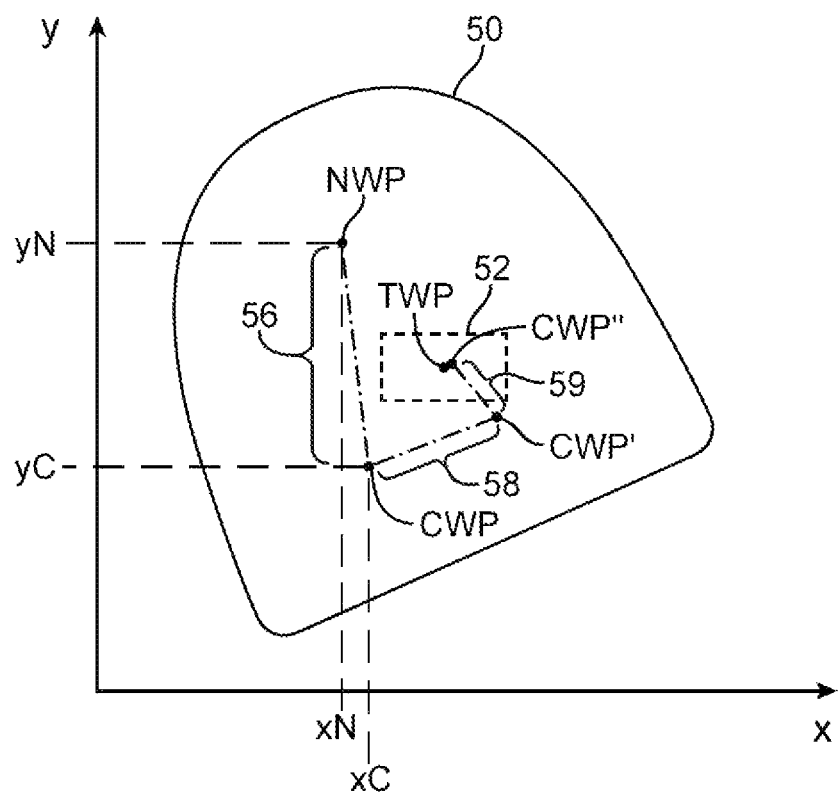
FIG. 5 is an illustrative chromaticity diagram showing how an adaptive, iterative set of calibration sequences may generate multiple display calibration corrections in accordance with an embodiment of the present invention.

As shown in FIG. 5, in some scenarios, native white point NWP of a display such as display 14 may be outside of acceptable range 52 of target white point TWP. During calibration operations, in response to determining that native white point NWP is outside of range 52 of target white point TWP, calibration computing equipment 42 may be used to make a first correction such as correction 56 to the white point of a display to correct the native white point NWP to a corrected white point CWP (e.g., during a first calibration sequence).

A display white point such as a native display white point NWP (e.g., a set of chromaticity values xN and yN that have been determined by calibration computing equipment 42) may be corrected to a corrected white point CWP=[xC,yC] by adjusting the relative maximum color output of the display. As an example, a display that generates maximum respective red, green, and blue color intensities Rmax, Gmax, and Bmax may be adjusted so that, during operation of the display, the corrected maximum respective red, green, and blue color intensities are 1.0 Rmax, 0.95 Gmax, and 0.91 Bmax. In this example, during operation of display 14, all blue display signals may be reduced by a factor 0.91 prior to sending the blue display signals to the blue display pixels and all green display signals may be reduced by a factor 0.95 prior to sending the green display signals to the green display pixels.

Display calibration data such as display calibration parameters 1.0, 0.95 and 0.91 (in the current example) may be determined by generating a set of target tristimulus values corresponding to target white point TWP, transforming the target tristimulus values to obtain target color intensities and, for example, comparing the target color intensities to the measured color intensities corresponding to native white point NWP (e.g., by dividing the target color intensities by the measured color intensities corresponding to native white point NWP).

Display calibration data such as white point calibration data for correcting the display control settings of the display may be uploaded or otherwise transmitted to device 10 from calibration computing equipment 42 over path 46. The uploaded display calibration data may, as examples, be applied to the relative power levels delivered from display driver circuitry 20 to light-emitting components 24 of display 14 or to display signals provided from circuitry 12 to display driver circuitry 20.

As shown in FIG. 5, calibration computing equipment may determine that corrected white point CWP is outside range 52. Corrected white point CWP may be outside of range 52 due to, for example, a non-linear dependence of color intensity on pixel supply power levels (i.e., reducing the power supplied to the pixels of a given color by a certain amount may reduce the intensity of light produced by those pixels by more (or less) than that certain amount).

Calibration computing equipment 42 may, in response to determining that corrected white point CWP is outside range 52, perform additional calibration sequences resulting in respective additional calibration corrections such as correction 58 (from corrected white point CWP to subsequent corrected white point CWP') and correction 59 (from subsequent corrected white point CWP' to further corrected white point CWP").

Calibration computing equipment 42 may, following each calibration sequence, determine whether or not to perform an additional calibration sequence and, in response to determining that an additional calibration sequence should be performed, select that calibration sequence based on the outcome of one or more preceding calibration sequences. Calibration computing equipment 42 may select a calibration sequence in which an additional set of performance statistics such as color cross-talk statistics, a display white point at a different grey level (e.g., a white point measured with all pixel intensities reduced by 50%), color mixing statistics (e.g., measured color intensities from a light-sensitive component of one color taken while operating display pixels of another color), individual color statistics (e.g., color intensities measured by a light-sensitive component of one color while operating only the pixels of that color), etc. is extracted from the performance data.

Calibration computing equipment 42 may be configured to perform adaptively configured calibration sequences until the corrected white point of the display is within range 52 of target white point TWP. In some scenarios, the first corrected white point CWP may be within range 52 and calibration operations may be terminated. In some scenarios, calibration computing equipment 42 may terminate calibration operations after a predetermined maximum number of calibration sequences have been performed. Calibration computing equipment 42 may be configured to select a calibration sequence (e.g., select the type of performance data to be gathered and/or select the type of statistics to be extracted from the gathered performance data) based on the results of one or more preceding calibration sequences.

As an example of adaptively selecting a calibration sequence, if native white point NWP is determined, during a calibration sequence, to be in the red portion of the chromaticity diagram (i.e., the white light generated by the display includes a relatively large amount of red light), computing equipment 42 may select a subsequent calibration sequence in which additional performance data is gathered while operating only (or primarily) red display pixels 30 of display 14 at various power levels. However, this example is merely illustrative. During each calibration sequence, calibration computing equipment 42 may gather more or less performance data than was gathered in other calibration sequences, gather the same or different data while operating the display using display calibration data obtained during a previous calibration sequence, and/or extract the same or different performance statistics from performance data gathered during that calibration sequence or any previous calibration sequence.

Figure 6:
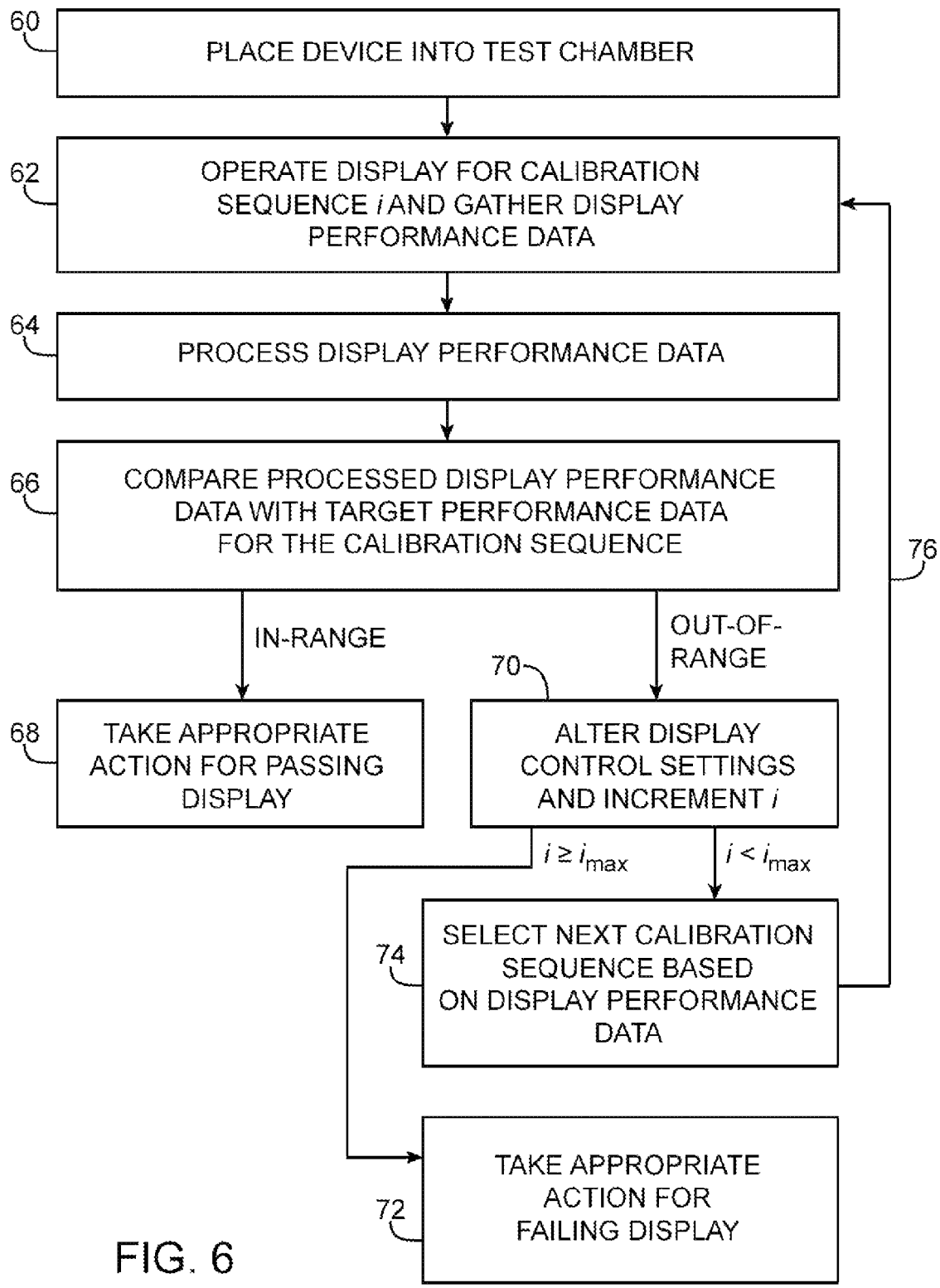
FIG. 6 is a flow chart of illustrative steps involved in performing calibration of electronic devices having displays in accordance with an embodiment of the present invention.

To conduct display calibration of a device (e.g., display white point calibration) using a calibration system of the type shown in FIG. 3, the steps of the illustrative flowchart of FIG. 6 may be performed.

At step 60, a device such as device 10 having a display may be placed into a test chamber such as test chamber 44.

At step 62, calibration system 40 may initiate a calibration sequence by operating the display and gathering display performance data while operating the display. Each calibration sequence may be associated with an index i. For the initial calibration sequence, i may be set to (for example) 1. Display 14 may be operated, for example, by computing equipment 42 (e.g., by issuing commands to device 10 to operate display 14) to illuminate some or all pixels of some or all colors at a given power level. While operating display 14, performance data may be gathered using a light sensor such as light sensor 48 in the test chamber.

At step 64, the gathered display performance data may be processed (e.g., using calibration computing equipment 42). Processing the display performance data may include extracting display performance statistics such as the native white point NWP (e.g., for calibration sequence 1), a corrected white point CWP (e.g., for calibration sequence 2), individual color intensities, or other suitable performance statistics from the display performance data.

At step 66, the processed display performance data (e.g., the extracted NWP, CWP, CWP', or other display performance statistics) may be compared with target performance data. The target performance data may be predetermined standard data that is common to all calibration sequences or may be specific to a given calibration sequence.

Comparing the display performance data to the target performance data may include comparing an extracted white point associated with the display to a target white point. Comparing an extracted white point associated with the display to the target white point may include determining whether or not the extracted white point is within an acceptable range (e.g., range 52 of FIGS. 3 and 4) around the target white point.

If desired, comparing the display performance data to the target performance data may include determining whether or not additional extracted display performance statistics are within predetermined ranges of corresponding additional target display performance data.

If it is determined that the extracted display performance statistics are within an acceptable range of the predetermined target data, calibration system 40 may proceed to step 68.

At step 68, appropriate action may be taken for a passing display. Appropriate action for a passing display may include terminating display calibration operations and shipping device 10 with the passing display to an end-user, passing device 10 with the passing display onto a subsequent calibration station or test station for calibrating or testing other components of device 10, or passing device 10 onto subsequent manufacturing stations for further assembly of device 10.

If it is determined that the extracted display performance statistics are outside of the acceptable range of the predetermined target data, calibration system 40 may proceed to step 70.

At step 70, calibration system 40 may alter the display control settings for display 14 and increment the calibration sequence index i (e.g., updating index i to i+1). Altering the display control settings for display 14 may include generating display calibration data for the display based upon measured differences between the extracted performance statistics and the target performance data and uploading the display calibration data to the electronic device over path 46.

Uploaded calibration data may be stored on device 10 and used to alter the display color performance of display 14 during subsequent calibration sequences. Uploading the determined calibration data to device 10 may include storing the calibration data in volatile or non-volatile memory in device 10 for access by software running on circuitry 12 and/or hard coding the determined calibration data into firmware associated with display 14 (e.g., display driver circuitry 20).

If the value of the incremented index i is greater than or equal to a maximum number of iterations (iMAX), calibration system 40 may proceed to step 72.

At step 72, appropriate action may be taken for a failing display. In situations in which calibration system 40 is unable to successfully calibrate display 14, a display may be considered a failing display. Appropriate action for a failing display may be replacing the display, reworking the display, returning the display to a vendor, or otherwise disposing of a failing display.

If the value of the incremented index i at step 70 is less than a maximum number of iterations (iMAX), calibration system 40 may proceed to step 74.

At step 74, calibration computing equipment 42 may select the next calibration sequence (measurement) based on the display performance data (e.g., display performance data gathered and processed during the current or previous calibration sequence(s)). Selecting the next calibration sequence may include selecting a calibration sequence in which more or less performance data is gathered than was gathered in other calibration sequences, the same or different performance data is gathered while operating the display using display calibration data uploaded to device 10 during a previous calibration sequence, and/or the same or different performance statistics are extracted from performance data gathered during the selected calibration sequence and any previous calibration sequence(s).

Following selection of the next calibration sequence, calibration system 40 may return to step 62 (as indicated by arrow 76) and initiate the selected next calibration sequence by operating display 14 and gathering new performance data.

Figure 7:
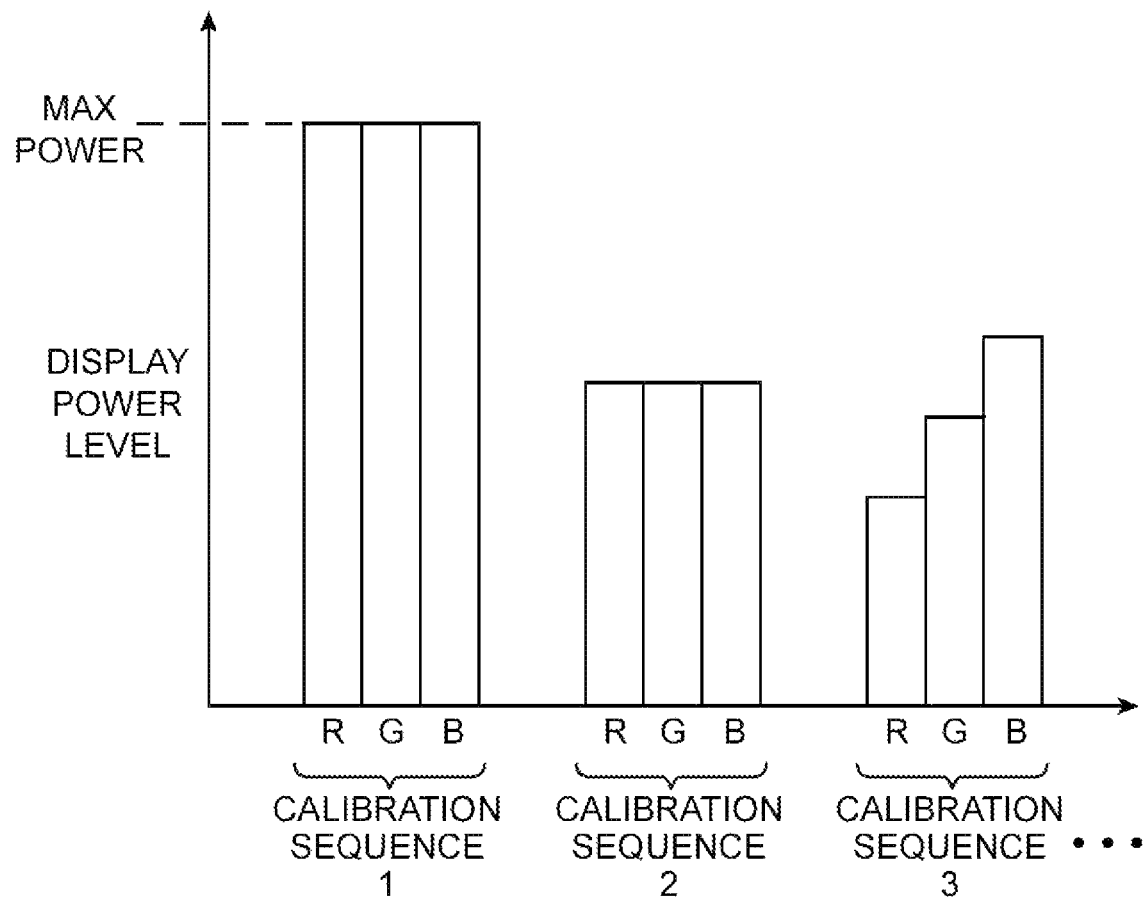
FIG. 7 is an illustrative diagram showing how calibration sequences may be selected in which a display may be operated in different modes of operation during calibration sequences in accordance with an embodiment of the present invention.

FIG. 7 is a diagram showing how each calibration sequence may include operating the display pixels of display 14 in a different operational mode. Calibration system 40 may be configured to gather and process display performance data while operating display 14 in each operational mode. In the example of FIG. 7, during a first calibration sequence, red (R), green (G), and blue (B) display pixels are operated at a maximum power level (e.g., for determining a display native white point). During a second calibration sequence, red (R), green (G), and blue (B) display pixels may be operated at common, reduced power level (e.g., for verifying the linearity of color intensity with display power level). During a third calibration sequence, red (R), green (G), and blue (B) display pixels may be operated at separate, different power levels. Subsequent calibration sequences may include additional operational modes for display 14.

The example of FIG. 7 in which the display pixels of display 14 are operated in one operational mode for each calibration sequence is merely illustrative. If desired, the display pixels of display 14 may be operated in more than one operational mode during each calibration sequence or in the same operational mode for all calibration sequences.

Figure 8:
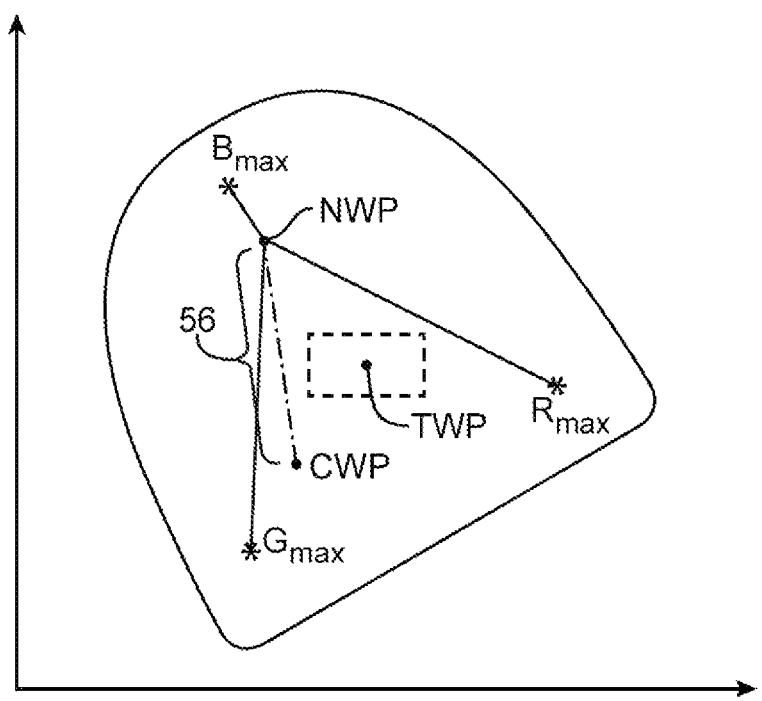
FIG. 8 is an illustrative chromaticity diagram showing how additional display performance statistics may be interpolated to generate a display calibration correction in accordance with an embodiment of the present invention.

FIG. 8 is a chromaticity diagram showing how multiple display performance data points may be gathered using multiple corresponding display operational modes during a calibration sequence.

As shown in FIG. 8, following a first calibration sequence in which a first correction 56 has been made, calibration computing equipment 42 may configure the following calibration sequence so that performance data is gathered while operating display 14 in three different operational modes (e.g., an operational mode with exclusively red (R) display pixels illuminated at full power, an operational mode with exclusively green (G) display pixels illuminated at full power, and an operational mode with exclusively blue (B) display pixels illuminated at full power).

While operating exclusively red, green and blue display pixels, light sensor 48 may be used to gather display performance data points such as respective maximum color intensities Rmax, Gmax and Bmax. Calibration computing equipment 42 may be configured to use multiple performance statistics such as NWP, Rmax, Gmax, and Bmax in an interpolation operation for determining the display calibration data that results in a corrected white point (e.g. CWP' of) that is equal to (or nearly equal to) target white point TWP.

In scenarios in which the corrected white point CWP' is still outside range 52 of target white point TWP, calibration computing equipment 42 may configure yet another calibration sequence so that additional display performance data points such as mixed color intensity data points gathered during that subsequent calibration sequence are gathered while operating the display in additional operational modes such as modes in which various mixtures of red (R), green (G), and blue (B) display pixels are operated. Calibration computing equipment 42 may interpolate between the additional performance data points and the previously gathered performance data points to generate display calibration data that results in a computed white point correction for correcting corrected white point CWP' to within range 52 of target white point TWP.

Figure 9:
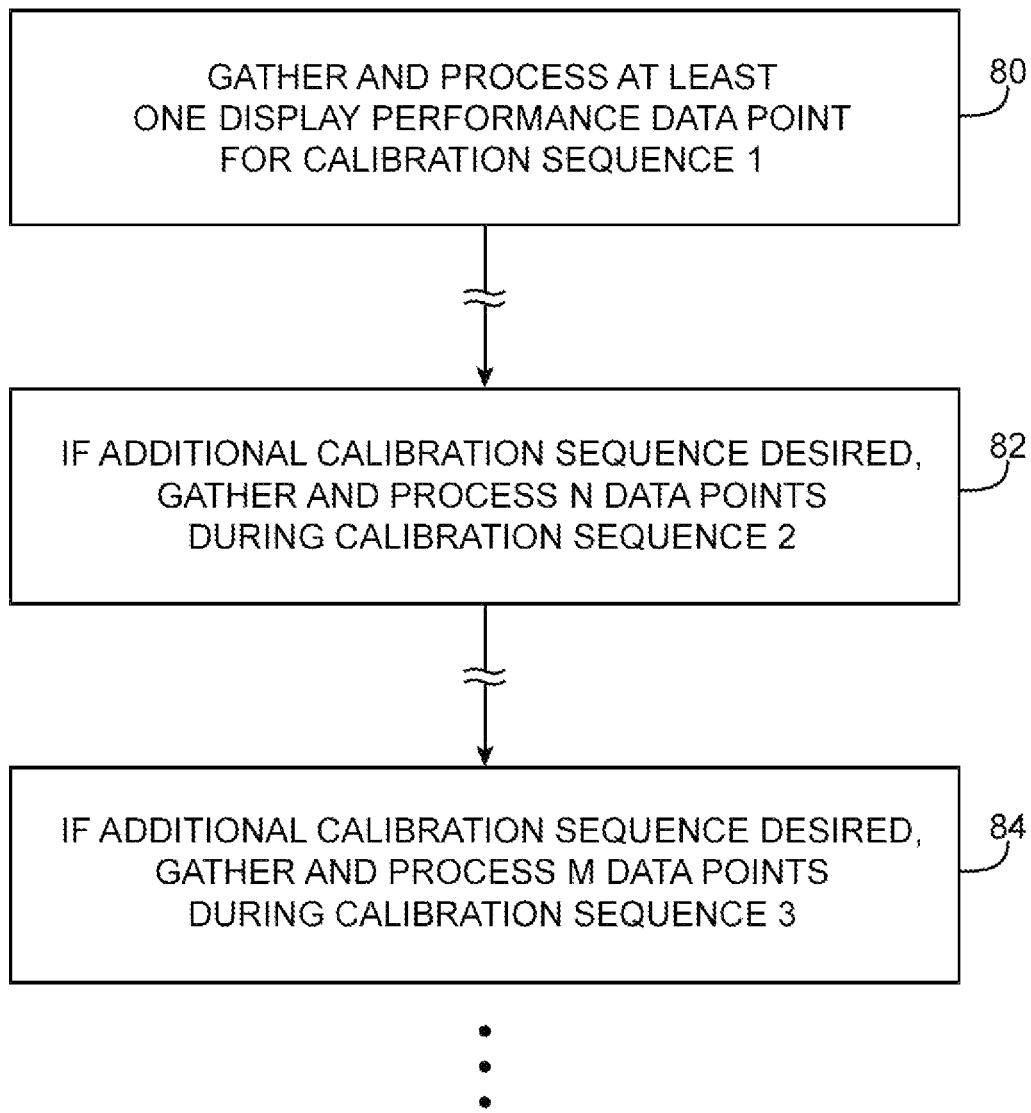
FIG. 9 is a flow chart of illustrative steps involved in performing calibration of electronic devices having displays in accordance with an embodiment of the present invention.

A flow chart of illustrative steps involved in adaptively selecting calibration sequences for calibration of displays in electronic devices is shown in FIG. 9.

At step 80, calibration equipment such as calibration computing equipment 42 and light sensor 48 may be used to gather and process at least one display performance data point (e.g., a native white point) for a first calibration sequence.

At step 82, following additional calibration sequence steps for the first calibration sequence such as the steps described above in connection with FIG. 6, if a second calibration sequence is desired, calibration computing equipment 42 and light sensor 48 may be used to gather and process an additional number N of performance data points for a second calibration sequence. N may be any integer greater than or equal to 1. As an example, calibration computing equipment 42 may gather and process three additional performance data points as described above in connection with FIG. 8. Calibration computing equipment 42 may use the N performance data points along with or separately from the display performance data point gathered and processed at step 80.

At step 84, following additional calibration sequence steps for the second calibration sequence such as the steps described above in connection with FIG. 6, if a third calibration sequence is desired, calibration computing equipment 42 and light sensor 48 may be used to gather and process an additional number M of performance data points for a second calibration sequence. M may be any integer greater than or equal to 1. As an example, calibration computing equipment 42 may gather and process two additional performance data points such as two mixed color intensity data points. Calibration computing equipment 42 may use the M additional performance data points along with or separately from the N display performance data points gathered and processed at step 82 and the display performance data point gathered and processed at step 80.

Additional calibration sequences may be performed by calibration system 40 until the display is determined to be a passing (e.g., calibrated) display or a failing display.

Figure 10:
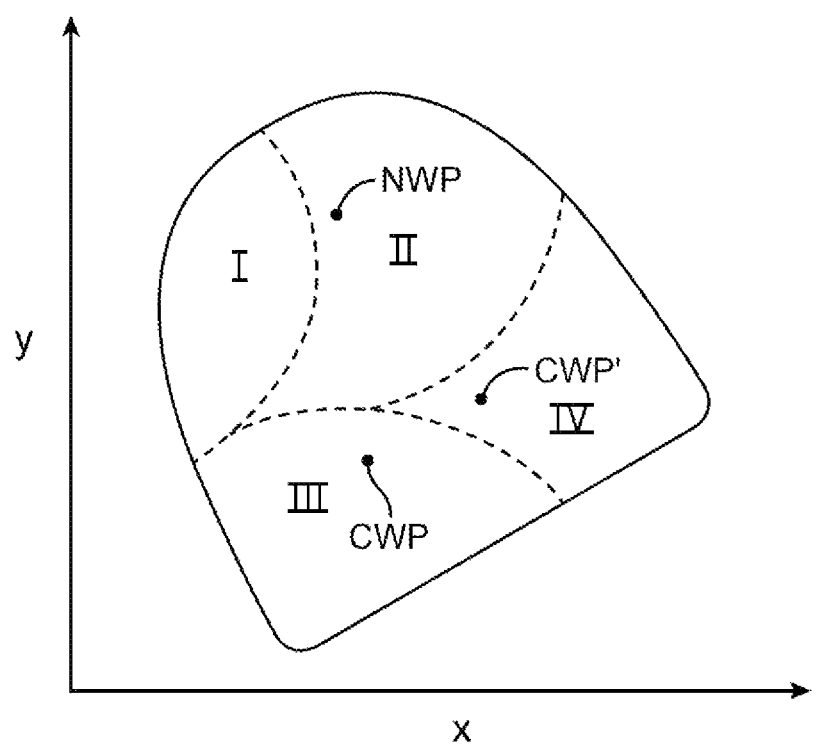
FIG. 10 is an illustrative chromaticity diagram showing how a display white point measured during a calibration sequence may be used in selecting a subsequent calibration sequence in accordance with an embodiment of the present invention.

FIG. 10 is a chromaticity diagram showing how display performance data for a calibration sequence may be used by system 40 for selecting a subsequent calibration sequence.

As shown in FIG. 10, the chromaticity diagram may be divided into portions such as portions I, II, III, and IV. Displays having native white points in one portion may have common characteristics that are distinct from characteristics of displays having native white points in other portions.

A calibration sequence in which one type of display performance data is gathered may be more efficient for calibrating a display having a native white point in, for example, region I than for calibrating a display having a native white point in, for example, region III. Therefore, calibration system 40 (e.g., calibration computing equipment 42) may determine that native white point NWP is in region II during a first calibration sequence and, based on the location of native white point NWP in region II, select a calibration sequence specific to displays with native white points in that region for the next calibration sequence.

Following corrective action for the display based on the display performance data of the first calibration sequence, during the region-II-specific second calibration sequence, the corrected white point CWP of the display may be determined to be located in region III. Based on the location of corrected white point CWP in region III, calibration computing equipment 42 may select yet another calibration sequence specific to displays with white points in region III for the next calibration sequence.

A calibration system such as calibration system 40 may adaptively and iteratively select and execute calibration sequences until a display is determined to be successfully calibrated or until a maximum number of calibration sequences have been executed.

The example of FIG. 10 is merely illustrative. Display performance data gathered during a calibration sequence may be used in any suitable way for selecting the properties of a subsequent calibration sequence.

The foregoing is merely illustrative of the principles of this invention and various modifications can be made by those skilled in the art without departing from the scope and spirit of the invention.

What is claimed is:

1. A method of calibrating an electronic device having a display using a calibration system, wherein the calibration system includes calibration computing equipment and a light sensor, the method comprising:
   generating display light using the display;
   with the calibration computing equipment and the light sensor, gathering display performance data that is associated with the display light that is being generated;
   comparing the gathered display performance data to target performance data; and
   in response to determining that the gathered display performance data is outside a predetermined range of the target performance data, performing display white point calibration for the display by providing display calibration data from the calibration computing equipment to the electronic device, wherein the display calibration data includes adjustment values that adjust display power levels by an amount corresponding to the gathered display performance data.

2. The method defined in claim 1 wherein comparing the gathered display performance data to the target performance data comprises:
   with the calibration computing equipment, extracting display performance statistics from the gathered display performance data; and
   with the calibration computing equipment, comparing the extracted display performance statistics to the target performance data.

3. The method defined in claim 1 further comprising:
   with the calibration computing equipment, determining whether to gather additional display performance data based on the comparison of the display performance data to the target performance data.

4. The method defined in claim 1 wherein comparing the gathered display performance data to the target performance data comprises:
   with the calibration computing equipment, extracting native white point data for the display from the gathered display performance data; and
   with the calibration computing equipment, comparing the extracted native white point data to target white point data.

5. The method defined in claim 4 wherein comparing the extracted native white point data to the target white point data comprises determining whether the extracted native white point data is within a predetermined range of the target white point data.

6. The method defined in claim 5 further comprising:
in response to determining that the native white point data is outside the predetermined range of the target white point data, performing the display white point calibration for the display.

7. The method defined in claim 5 further comprising:
in response to determining that the native white point data is outside of the predetermined range of the target performance data, gathering additional display performance data.

8. The method defined in claim 5 further comprising:
with the display, generating additional display light using the display calibration data;
with the calibration computing equipment and the light sensor, gathering additional display performance data while the display generates the additional display light; and
comparing the gathered additional display performance data to the target performance data to determine whether to perform an additional display white point calibration for the display.

9. The method defined in claim 1 wherein gathering the display performance data comprises:
gathering at least a first display performance data point while providing power exclusively to display pixels of a first color; and
gathering at least a second display performance data point while providing power exclusively to display pixels of a second color, wherein the second color is different than the first color.

10. A calibration system for white point calibration of a display in an electronic device, comprising:
a light sensor; and
calibration computing equipment configured to:
gather display performance data by measuring display light from the display using the light sensor,
compare the gathered display performance data to target performance data, and
gather additional display performance data in response to comparing the gathered display performance data and the target performance data, wherein gathering the additional display performance data comprises:
gathering at least a first display performance data point while providing power exclusively to display pixels of a first color; and
gathering at least a second display performance data point while providing power exclusively to display pixels of a second color, wherein the second color is different than the first color.

11. The calibration system defined in claim 10 wherein the calibration computing equipment is configured to gather the display performance data while operating the display in a first operating mode and is configured to gather the additional display performance data while operating the display in a second operating mode that is different than the first operating mode.

12. The calibration system defined in claim 11 wherein the calibration computing equipment is further configured to determine whether to perform a display white point calibration for the display based at least partly on the gathered additional display performance data.

13. The calibration system defined in claim 10 further comprising a test chamber in which the light sensor is mounted.

14. A method for obtaining display calibration parameters for an electronic device having a display using a calibration system having calibration computing equipment, the method comprising:
with the calibration computing equipment, performing a first calibration measurement for the display, wherein performing the first calibration measurement for the display includes gathering at least one display performance data point;
with the calibration computing equipment, selecting a second calibration measurement to perform for the display based on the at least one display performance data point;
with the calibration computing equipment, performing the selected second calibration measurement for the display, wherein performing the selected second calibration measurement for the display includes gathering at least one additional display performance data point; and
with the calibration computing equipment, selecting a third calibration measurement to perform for the display based on the at least one additional display performance data point; and
with the calibration computing equipment, performing the selected third calibration measurement for the display.

15. The method defined in claim 14 wherein the calibration system includes a light sensor, wherein performing the first calibration measurement for the display comprises:
operating the display in an operational mode; and
with the calibration computing equipment and the light sensor, gathering the at least one display performance data point while operating the display in the operational mode.

16. The method defined in claim 15 wherein performing the selected second calibration measurement for the display comprises:
operating the display in at least one additional operational mode that is different than the operational mode; and
with the calibration computing equipment and the light sensor, gathering at least one additional display performance data point while operating the display in the at least one additional operational mode.

17. The method defined in claim 15 wherein operating the display in the operational mode includes providing power simultaneously to display pixels of a plurality of colors in the display.

18. The method defined in claim 17 wherein performing the selected second calibration measurement for the display comprises:
providing power exclusively to display pixels of a first one of the plurality of colors;
with the calibration computing equipment and the light sensor, gathering a first additional display performance data point while providing power exclusively to the display pixels of the first one of the plurality of colors;
providing power exclusively to display pixels of a second one of the plurality of colors; and
with the calibration computing equipment and the light sensor, gathering a second additional display performance data point while providing power exclusively to display pixels of the second one of the plurality of colors.

19. The method defined in claim 14 wherein gathering the at least one display performance data point comprises gathering a first display performance data point, wherein gathering the at least one additional display performance data point comprises gathering second, third, and fourth display performance data points, and wherein performing the third calibration measurement for the display includes gathering at least a fifth display performance data point for the display.

20. The method defined in claim 19, wherein gathering the first display performance data point comprises determining a native white point for the display, wherein gathering the second, third, and fourth display performance data points comprises determining first, second, and third, color intensity data points, and wherein gathering the at least a fifth display performance data point comprises determining at least one mixed color intensity data point.

21. The method defined in claim 14 wherein performing the first calibration measurement for the display further comprises providing display calibration data to the electronic device and wherein performing the selected second calibration measurement for the display comprises operating the display using the provided display calibration data.

* * * * *